United States Patent [19]

Colby et al.

[11] Patent Number: 4,944,906
[45] Date of Patent: Jul. 31, 1990

[54] METHODS OF INJECTION MOLDING AND EXTRUDING WET HYGROSCOPIC IONOMERS

[75] Inventors: Paul N. Colby, New Castle, Pa.; Michael F. Durina, Poland, Ohio

[73] Assignee: Spirex Corporation, Youngstown, Ohio

[21] Appl. No.: 255,883

[22] Filed: Oct. 11, 1988

[51] Int. Cl.⁵ .................. B29C 45/63; B29C 47/60; B29C 47/76
[52] U.S. Cl. .................. 264/101; 264/211.23; 264/328.1; 264/331.18; 366/88; 366/89; 366/323; 425/203; 425/208; 425/812; 528/501
[58] Field of Search .................. 264/101, 102, 211.21, 264/211.23, 328.1, 331.18; 425/203, 208, 209, 812, DIG. 60; 366/88, 89, 323; 528/501

[56] References Cited

U.S. PATENT DOCUMENTS

| | | | |
|---|---|---|---|
| RE.28,901 | 7/1976 | Kim | 425/208 |
| 3,264,272 | 8/1966 | Rees | 428/36.9 |
| 3,271,819 | 9/1966 | Lacher | 366/89 |
| 3,375,549 | 4/1968 | Geyer | 366/83 |
| 3,653,637 | 4/1972 | Eckhardt | 366/89 X |
| 3,698,541 | 10/1972 | Barr | 366/88 X |
| 3,826,477 | 7/1974 | Kunogi et al. | 425/203 X |
| 4,128,341 | 12/1978 | Hsu | 366/89 |
| 4,129,386 | 12/1978 | Rauwendaal | 366/88 |
| 4,155,655 | 5/1979 | Chiselko et al. | 366/88 X |
| 4,185,060 | 1/1980 | Ladney, Jr. | 264/211.23 X |
| 4,330,214 | 5/1982 | Willert | 366/78 |
| 4,341,474 | 7/1982 | Wheeler, Jr. et al. | 366/88 |
| 4,367,190 | 1/1983 | Beach | 366/89 X |
| 4,557,852 | 12/1985 | Schulz et al. | 252/95 |
| 4,569,595 | 2/1986 | Maillefer | 366/88 |
| 4,752,136 | 6/1988 | Colby | 366/89 |
| 4,770,539 | 9/1988 | Heathe | 366/88 |
| 4,797,221 | 1/1989 | Gueldenzopf | 252/95 |

FOREIGN PATENT DOCUMENTS

| | | | |
|---|---|---|---|
| 34505 | 8/1981 | European Pat. Off. | |
| 50-28467 | 9/1975 | Japan | 425/208 |
| 61-43532 | 3/1986 | Japan | 425/208 |

OTHER PUBLICATIONS

"Screw and Barrel Technology", Spirex Corporation (1985).
Trade Journal Excerpts (4 articles).
Dupont Technical Report, Number 201, "Molding of Dupont Engineering Thermoplastics Using Vented Barrel Reciprocating Screw Injection Machines," W.P. Filbert, Jul., 1979.
Kinsey, Roy H., "Ionomers, Chemistry and New Developments", *Applied Polymer Symposia*, No. 11, pp. 77–94 (1969).

*Primary Examiner*—Jeffery Thurlow
*Assistant Examiner*—Leo B. Tentoni
*Attorney, Agent, or Firm*—Millen, White & Zelano

[57] ABSTRACT

Ionomers can be injection molded and extruded in wet condition using a vented, two-stage barrier screw wherein the barrier flight melt channel is operated only partially filled.

20 Claims, 4 Drawing Sheets

METHODS OF INJECTION MOLDING AND EXTRUDING WET HYGROSCOPIC IONOMERS

BACKGROUND OF THE INVENTION

This invention relates to methods for injection molding and extruding wet hygroscopic ionomers, e.g., Surlyn ® (registered trademark of E.I. DuPont deNemours & Co., Wilmington, Del.), to prepare ionomer components having excellent properties.

It is well known that a wide variety of thermoplastic polymers can be injection molded and/or extruded to prepare polymeric components now ubiquitous in commerce. Moisture contained in such thermoplastic resins can have deleterious effects on the properties of the plastic components if not removed from the polymer prior to the point of injection into a mold or extrusion through a die. Many ways are known or have been suggested to remove absorbed water from thermoplastic resins either prior to or during the injection molding or extrusion process.

Two drying methods are common. Drying ovens or hopper dryers for feeding the thermoplastic resins have been successfully employed for many polymers. These often are problematic or too expensive. An alternative approach is to use a vented barrel for the injection molding or extrusion operation. See, e.g., U.S. Pat. Nos. 3,826,477, 4,155,655, 4,185,060, 4,367,190 and many others.

A Wide variety of screws and operating conditions can be used in conjunction with vented barrels in both injection molding and extrusion methods. Many of the considerations important in designing systems for vented barrel thermoplastic processing are discussed in *Dupont Technical Report*, Number 201, "Molding of Dupont Engineering Thermoplastics Using Vented Barrel Reciprocating Screw Injection Machines," W.P. Filbert, July, 1979, whose entire disclosure is incorporated by reference herein. One type of screw discussed by Filbert is the barrier screw, many designs for which are known. See, for example, U.S. Pat. Nos. 3,375,549, 3,698,541, 4,128,341, 4,341,474, etc., EPA 0,034,505, "Screw and Barrel Technology", 1985, Spirex Corporation, 8469 Southern Boulevard, P.0. Box 3409, Youngstown, Ohio 44512, and the like, whose entire disclosures are incorporated by reference herein. Many other barrier screw designs are known.

Figure 1:
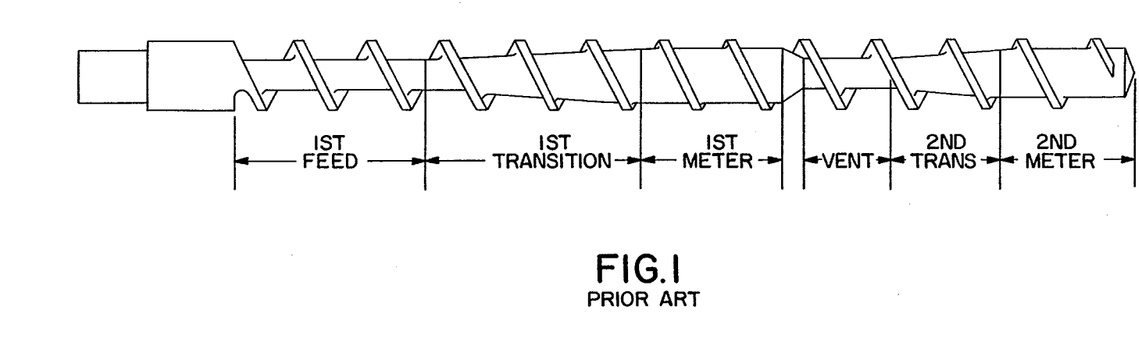
FIG. 1 illustrates a conventional non-barrier-type two-stage screw.

A two-stage "barrier screw" is a special type of two-stage screw. In a normal two-stage screw (see FIG. 1), the first stage comprises the initial feeding section, a first transition zone and a first metering zone. The second stage comprises a vent section, followed by a second transition zone and a second metering zone. In a two-stage barrier screw, a section of the screw, usually the first transition section, is split into two different channels by the initiation of a secondary flight, typically at the beginning of the transition section. See FIGS. 2 and 3. The forwardmost of the two progressing adjacent channels is a solids channel; the rearmost is a melt channel. As the solids melt in the leading channel, the melted polymer passes over the top of the barrier flight into the melt channel whereby the solid and melt phases are maintained essentially separate from one another. This results in significant advantages, including more efficient, uniform and complete melting of the solids, more efficient refinement of the melted polymer with lower shear and overheating, etc.

Although the foregoing drying techniques have been successfully applied commercially to many thermoplastic polymers, there still exist certain classes of polymers which have not been adequately dryable just prior to or during injection molding and/or extrusion. One class of thermoplastic polymers to which these conventional techniques have been inapplicable is that of the ionomeric polymers (ionomers), such as the polyethylene ionomers typified by Surlyn ®.

The problem for ionomers such as Surlyn ® has been so severe that it has heretofore been commercially injection moldable and extrudable only when provided dry in air-tight containers. Otherwise, these very hygroscopic ionomers quickly absorb moisture from the atmosphere which precludes successful injection molding and extrusion using any known methods. When attempts have been made to injection mold or extrude Surlyn ® having a water content at or above the water content of Surlyn ® when exposed to ambient conditions, totally unacceptable results occur. In conventional vented screw devices used in the past, the unusual combination of properties of ionomers (low softening temperatures (about 160° F.), high tackiness, high viscosity in the melt phase, high expandability, etc.) makes vent flooding and system plugging unavoidable, adequate drying unobtainable and significantly reduced rates a necessity where barely tolerable results might be achieved. Even simple hopper drying has been inapplicable due in part to the low vapor pressures achieved at the low softening temperatures typically above 150° F. Normally, much higher temperatures are available on other materials for drying.

Moreover, hopper jamming and plugging occur in hopper dryers. Where molded or extruded products are nevertheless obtained, they have been unacceptable because of the defects caused by contained moisture, e.g., splaying, voids, etc. Furthermore, other properties change as a function of the amount of water absorbed, making thermoplastic processing unreliable and unpredictable. These include changes in rheology which preclude acceptable component size control, changes in chemical reactivity with additives, changes in optical properties, etc.

Consequently, heretofore it has been necessary commercially to supply and maintain ionomers such as Surlyn ® in dry form, using hermetically sealed, moisture-proof containers. This requirement imposes a significant cost increase over the more conventional techniques of shipping thermoplastic resins in much larger lots under ambient conditions. Furthermore, even with this safeguard, extruders or injection molding machines processing dry ionomers can often be interrupted, e.g., because of cycle problems, mold adjustments, etc. Any unused ionomer exposed to the atmosphere is then usually discarded because it will quickly absorb sufficient moisture to make it thereafter unusable for the reasons discussed above. Similarly, it is usually not possible to regrind Surlyn ® and other ionomeric components.

Because of the foregoing state of the art, ionomers have never successfully been injection molded in wet form. There has been some limited success in the extrusion process using vented barrel extruders. However, this success has only been for a given resin under a limited set of conditions using a specific screw design. Any change in the properties of the resin, processing conditions or screw design has resulted in failure in the past. No system exists wherein thermoplastic processing can be conducted using a wide variety of ionomer resins under a wide variety of conditions.

This inability to dry moist ionomers or to thermoplastically process them commercially in wet form has plagued their injection molding and extruding applications. This has continued to be a severe problem despite improvements in state of the art knowledge concerning venting of a wide variety of thermoplastic resins.

SUMMARY OF THE INVENTION

Surprisingly, a very effective method has been developed for successfully injection molding and extruding ionomers such as Surlyn ® when in "wet" condition by applying vented two-stage barrier screw injection molding and extrusion techniques.

Consequently, in one aspect, this invention relates to a method of injection molding a wet hygroscopic ionomer (i.e., containing an amount of water necessitating drying of the ionomer during or prior to injection molding), comprising directly injection molding said wet ionomer using a reciprocating two-stage vented barrier screw having a barrier flight and a subsequent venting zone, wherein the barrier flight has a melt channel and a solids channel, the melt channel being only partially filled with melted ionomer, whereby the vapor phase adjacent to the melted ionomer in the barrier flight has access to said venting zone and vents therethrough.

In another aspect, this invention relates to a method of extruding a wet hygroscopic ionomer (i.e., containing an amount of water necessitating drying of the ionomer during or prior to extruding), comprising directly extruding said wet ionomer using a two-stage vented barrier screw having a barrier flight and a subsequent venting zone, wherein the barrier flight has a melt channel and a solids channel, the melt channel being only partially filled with melted ionomer, whereby the vapor phase adjacent to the melted ionomer in the barrier flight has access to said venting zone and vents therethrough.

In preferred aspects of this invention, the barrier flight is closed-ended at the downstream end, the screw is rotated in injection molding at an rpm value higher than normal for processing of the ionomer when in conventional dry form using a conventional single-stage screw system, and/or a starve feeder is employed for feeding the ionomer into the screw at a rate lower than the feed capacity of the screw. This invention is most preferably applicable to Surlyn ® and preferably employs a barrier screw such as that shown in FIGS. 2 and 3.

BRIEF DESCRIPTION OF THE DRAWINGS

Various other objects, features and attendant advantages of the present invention will be more fully appreciated as the same becomes better understood when considered in connection with the following discussion the accompanying drawings, in which like reference characters designate the same or similar parts throughout the several views, and wherein.

DESCRIPTION

As can be seen, it has been discovered that, despite the long-held prejudice against their ventability based on results of previous two-stage screw designs, vented two-stage barrier screw operation of an injection molding machine (reciprocating screw) or an extruder can successfully vent wet ionomers such as Surlyn ®. The employment of such a configuration has heretofore never been suggested for use with such ionomers. Filbert, supra, has suggested that such methods are applicable to the venting of other thermoplastic resins such as the Dupont engineering thermoplastics list therein, i.e., Delrin ® acetal resins, Lucite ® acrylic Minlon ® mineral reinforced nylon resins, Zytel ® nylon resins, and Zytel ® reinforced nylon resins. Such engineering plastics, of course, have properties much different from the unique properties of ionomer resin which lead to the drying problems discussed herein. These properties and the long-standing inability of skilled workers to successfully vent or otherwise dry wet ionomers using any known techniques associated with thermoplastic processing, have established a strong prejudice against the successful applicability of all known techniques.

Nevertheless, given the discovery of this invention, in combination with the guidelines provided by this specification, a skilled worker can routinely determine appropriate parameters for successful venting of ionomers using vented two-stage screws which incorporate a wide variety of barrier designs. Many of the considerations important to a routine determination of such parameters are discussed in the Filbert monograph, supra, concerning other more conventional engineering plastics. Of course, the unique properties of ionomers, e.g., as contrasted with those of the engineering thermoplastics of concern in Filbert, will lead to significantly different operating parameters. For example, the ionomers are less crystalline and rigid than the engineering thermoplastics mentioned by Filbert. They have much lower softening temperatures and much higher viscosities in the melt state. They also have problematic high expansion properties when exposed to the decompression vent stage.

The term "wet" as used herein refers to an amount of water heretofore necessitating drying prior to or during injection molding or extrusion. Thus, it refers to amounts of water which heretofore were commercially unacceptable for injection molding and extruding of ionomers because attempts to process the same rendered the injection molding or extruding system inoperable due to screw and feed throat bridging, vent plugging and/or flooding, or because the resultant molded or extruded products were unacceptable to end users, e.g., due to improper devolatilization levels which lead to defects and imperfections such as voids and splaying and especially because of lack of size control.

Figures 2, 3:
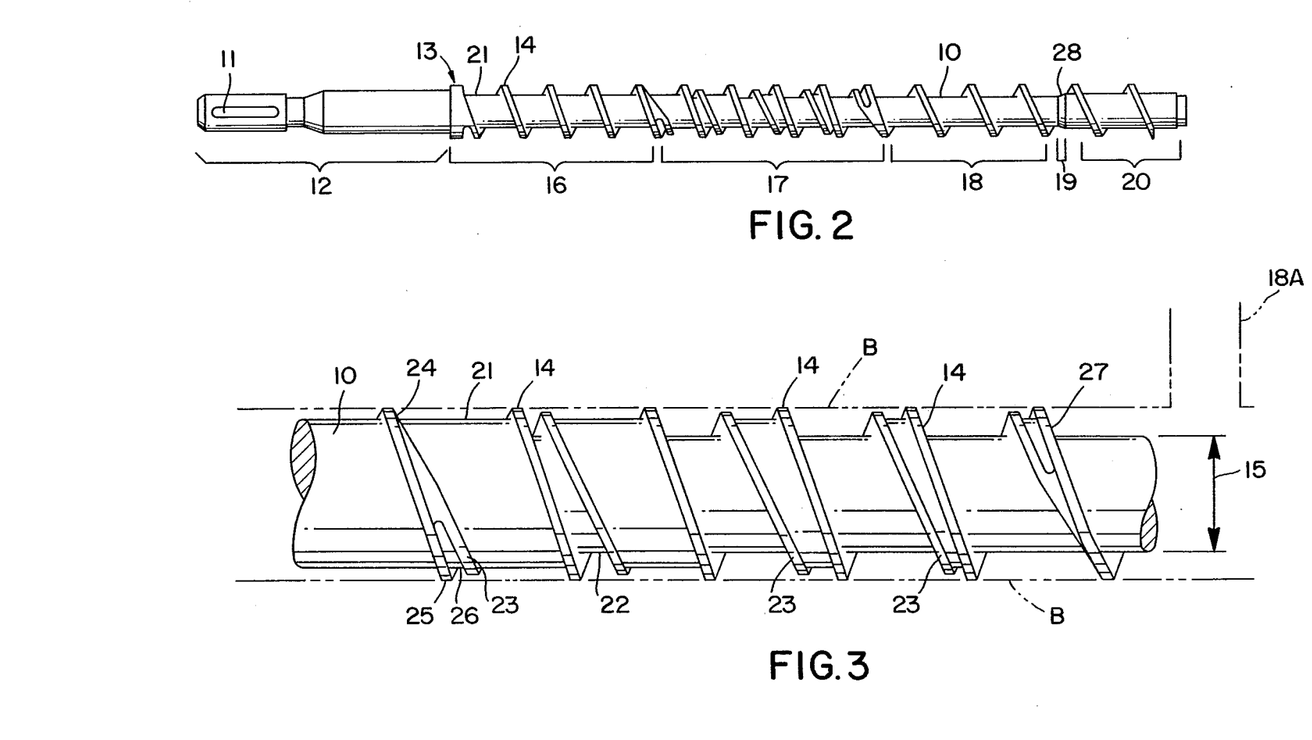
FIG. 2 illustrates a preferred vented two-stage barrier screw.
FIG. 3 shows details of the barrier section of the screw of FIG. 2.

One especially preferred feature of this invention is the employment of a barrier flight design where the solids channel is closed-ended at the downstream end. With reference to FIGS. 2 and 3, this feature can be seen where the solids channel of the barrier flight disappears into the last primary flight 27 of the barrier section. Other conventional barrier designs exist where the solids channel does not merge with the primary flight. Rather, the barrier flight remains more or less parallel to the terminal primary flight in the barrier section, whereby any remaining solids in the solids channel flow into the primary melt channel leading to the vent zone (open-ended). Closed-ended operation is greatly preferred, e.g., because it facilitates control of the extrusion rates of the screw.

Achievement of a proper match or balance of pumping capacity of the first stage to that of the second stage is critical. Normally, these pumping capacities are balanced by appropriate, conventional tuning of barrel temperature settings and screw rpm settings and of the metering channel capacity of the second stage to the metering and feed depths of the first stage. However, where a barrier design is incorporated, the situation is more complex. For example, the barrier clearance in the barrier screw becomes an important parameter for achieving pumping capacity. This is the distance between the top of the barrier flight and the barrel wall. The barrier clearance for use in this invention will typically be somewhat smaller than normally employed in conjunction with more conventional engineering plastics. For example, when processing conventional thermoplastic resins using the vented two-stage barrier screw shown in FIG. 2, barrier clearances are in the range of 35-60, typically 40-60 thousandths for larger screws (20-30 length/diameter (L/D) ratios) and 35-50 thousandths for smaller screws (16-26 length/diameter ratios). For Surlyn ® and other ionomers, the barrier clearances for the screw will typically be on the order of 30-40 thousandths for the mentioned smaller screws.

Another factor in adjusting pumping capacities is the rate at which material is fed to the screw. Although not absolutely necessary, it is preferred that the ionomers be processed in accordance with this invention in conjunction with a starve feeder. The latter is a well-known device which controls the feed rate of a thermoplastic or other polymer such that the maximum capacity of a screw can be under-utilized. In addition to providing a further ability to control pumping capacities, this feed control feature further enables control to avoid vent flooding and plugging, i.e., flow of the devolatilized ionomer through the vent hole 18A of the barrel of the injection molding machine or extruder. Furthermore, employing a starve feeder permits operation wherein above the solids in the partially filled feed channels of the screw there is a vapor channel communicating back to the atmosphere bypassing the feeder hopper, thereby eliminating the recondensing of water vapor on the resin particles. Suitable starve feeders are known and are commercially available, e.g., from Spirex Corporation and others. Moreover, see Filbert, supra. Use of a starve feeder is especially preferred in conjunction with the barrier screw of FIGS. 2 and 3. Typically, the feed rate employed is 40-70%, e.g., 50%, preferably 70%, of the capacity of the feed section of the screw. This feature also assists in control of the pumping capacity and assuring a partially filled decompression zone.

Applicable pumping capacities between the first and second stages can be routinely determined. Typically, these are in the range of 1.5-2.0, higher and lower values also being useful.

Regarding general techniques and considerations employed in determining an appropriate ratio of pumping capacities for a given screw/resin combination, see Filbert, supra.

While the barrier screw of FIGS. 2 and 3 is preferred, essentially any screw can be employed in conjunction with this invention. Such screws are shown on pages 20-22 of "Screw and Barrel Technology," supra, as well as in Filbert and the patents cited above, inter alia.

It is also preferred in injection molding that the reciprocating vented two-stage screw be operated at an rpm rate which is higher than normally employed, i.e., higher than the rate at which a conventional reciprocating single-stage screw is operated when used to injection mold the ionomer as conventionally processed in dry form. Normally, a screw is rotated as slowly as possible within overall system requirements, especially those imposed by cycle time considerations. In this way, excess heat, melt shear, etc., are avoided. However, for this invention, this conventional wisdom surprisingly does not apply. Thus, typically, ionomers have been injection molded using single-stage screws rotating at a rate of 40-60 rpm. (L/D's of 16 to 20.) For this invention, these rates are typically increased by factors of 30-100%, higher and lower values also being useful. Higher rpm's are especially advantageous when a starve feeder is employed to compensate for the low material feed rate. These higher rotation rates offer several advantages, primarily facilitating pressure build-up for retraction of the only partially filled barrier screw and, hence, cycle optimization, and also to help prevent vent flooding when used in conjunction with a starve feeder. The applicability of such high rpm values to venting of these high viscosity ionomers is surprising since many thermoplastic resins burn or are otherwise deleteriously affected when such high rates are utilized.

Another parameter which can affect vent bleeding is backpressure. However, this parameter can be routinely set to avoid such problems in conventional consideration of the usual variables, perhaps with a few orientation experiments, including the nature of the hydraulic circuitry and the drive unit (e.g., its weight), screw L/D and length of the second metering zone. Typically, the maximum backpressure will be in the range of 75-100 psig, higher and lower values being applicable also.

Similarly, other conventional processing and system parameters can be routinely determined for this invention, including barrel temperature profiles, L/D's, root diameters, flight geometry, flight leads, feed rates, pellet sizes, non-return valve design, cycle time, shot sizes, vent port design (both evacuated (vacuum) ports and the preferred ambient ports being applicable), injection speed, pressure profiles, etc., using fully conventional considerations, e.g., as discussed in the several references cited herein and also in general treatises, e.g., *Injection Molding, Theory and Practice*, Rubin, John Wiley (*1972*); *Injection Molding Handbook*, Rosato and Rosato, Van Nostrand Rheinhold (*1986*).

The specific design details of the barrier section can also be varied. In addition to the discussed solids channel downstream closed-endedness, an important feature of this invention is that the barrier melt channel increase in capacity (e.g., by increasing in depth and/or width) as the barrier flight progresses, i.e., approaches closer to the venting zone. The channel capacity must be designed in conjunction with the other system parameters to ensure that the melt channel remains only partially filled throughout the barrier flight. In this way, the unfilled volume of the barrier melt channel remains in direct communication with the venting zone, whereby the vapor above the melt in the barrier section can be continuously vented, not only in the vent section per se, but also in the barrier section. This significantly contributes to the ability of this invention to effectively vent ionomers. This requirement can be achieved utilizing the barrier designs described in the references mentioned above, and others. In addition to barrier melt channel volume, the parameters of feed rate, e.g., control by a starve feeder and, to a lesser extent, barrier clearance can also be adjusted to provide the necessary partial filling. In the preferred barrier design of FIG. 3, partial filling is primarily achieved by decreasing the root diameter in the barrier zone to that of the devolatilization zone. This, in combination with increasing the barrier melt channel width, easily provides the necessary capacity for partial filling. Where necessary, pitch or lead in the downstream portion of the screw's second stage can be increased to enable the second stage to pump more in relation to the first stage.

The preferred overall screw is that of FIG. 2. It is especially advantageous because it enables effective venting for the difficult-to-vent ionomer thermoplastics, using a relatively short screw which can be used, e.g., to retrofit standard length injection molding machines (and, correspondingly, extruders). The screw of FIGS. 2 and 3 is for injection molding. An analogous screw for extrusion can be routinely designed.

The screw comprises a main body member 10, having a keyway 11, a shank area 12 and a bearing portion 13 at its origin.

The working portion of the screw has an enlarged helical flight 14 of constant diameter and usually also constant pitch (which optionally can vary) extending the length of the screw. The screw is nominally divided into a feed section 16, a transition-barrier section 17, a vent section 18 (venting through vent opening 18A (FIG. 3)), a second transition section 19 and a metering section 20. Ionomer pellets are fed into the screw via helical continuous pocket 21. The rotation of the screw within injection barrel B, shown by dotted lines in FIG. 3, forces the ionomer granules to advance along the feed pocket where some initial melting occurs.

The primary melting function occurs in the transition-barrier section 17. The barrier characteristic is provided by the introduction of a second helical barrier flight 23 at the beginning of the transition section and growing out of the leading edge 24 of the last primary flight 25 of the feed section. The melt channel formed by the barrier flight has a root diameter 22, smaller than the normal root diameter of the screw in the metering section, and essentially the same as the root diameter 15 of the devolatilization (venting) zone. The barrier flight continues from the leading edge of the initial primary flight of the transition section to the trailing edge of the last primary flight 27 of the transition zone. The barrier flight divides each of the primary channels 21 into two sections. The leading section in each case is a solids channel wherein melting occurs. The trailing channel in each case receives melt from its corresponding leading solids channel. The melt channels increase in volume from the beginning to the end of the barrier flight section. The volume increase is achieved primarily by an increase in the melt channel width but a decrease in root diameter is also involved at the very beginning of the barrier section. Other conventional barrier screws achieve an increase in melt channel volume primarily by root diameter decrease.

The barrier flight 23 has an outside diameter slightly smaller than that of the primary helical flight 14. This provides space (barrier clearance) between the barrel and the barrier flight for melted resin to pass over and into the melt channel 26, partially filling the same. As discussed herein, the width and depth of the melt channel 26 is designed to provide a melt channel volume throughout the barrier flight section such that the channel remains only partially filled whereby the barrier section is in constant vapor communication with the vent section. The melt thus is vented, not only in the vent section per se, but also throughout the barrier section.

The vent section 18 contains only the primary flight but has a reduced root such that a pressure reduction occurs in order to facilitate venting of gaseous materials from the melt. In a preferred embodiment, the helical flights 14 within the vent section are tapered at approximately 15° angles in order to maintain the product in contact with the root of the screw, thereby reducing product drool, sometimes associated with vented screws.

In another preferred aspect, the second transition section 19 is a steep, conical portion 28 permitting the root diameter of the vent section to be increased rapidly to the root diameter of the metering section. This transition length is very small in comparison with most injection molding or extrusion screws and provides the advantage that more of the screw length can be utilized in accomplishing the other functions of the screw, especially melting, venting and metering. It also enables retrofitting standard length machines with such multiple function screws. For example, this relatively short transition section provides the capability for the preferred screw of this invention to provide good venting for ionomers despite relatively low screw length to screw diameter ratios of about 18-20:1, instead of the more conventionally utilized 26:1-32:1.

As with the typical barrier screw, the instantaneous ratio of barrier melt channel volume to barrier solids channel volume throughout the barrier section is designed such that melting of the solids in the solids channel is optimized and the flow of the melt in the melt channel is maintained relatively shear-free, especially in view of the partial filling discussed above. By the end of the barrier section, all of the solid particles will be melted and transferred to the melt channel.

Figure 4:
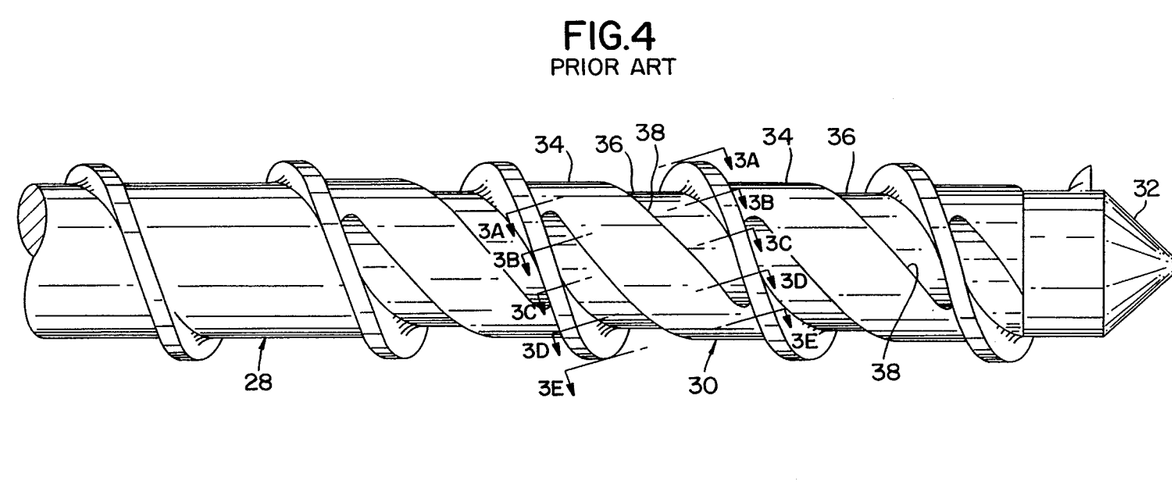
FIG. 4 shows a blown-up view of a Pulsar ™ metering section.
Figure 5A:
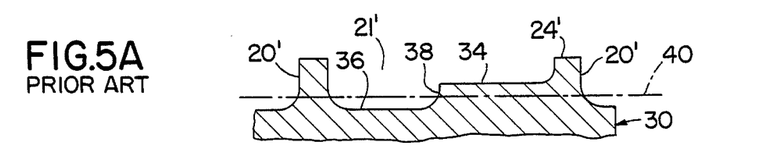
FIGS. 5A–5E present five consecutive cross-sectional views taken through the metering section of FIG. 4.
Figure 5B:
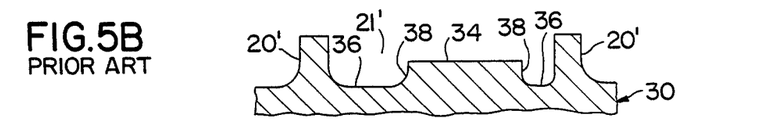
Figure 5C:
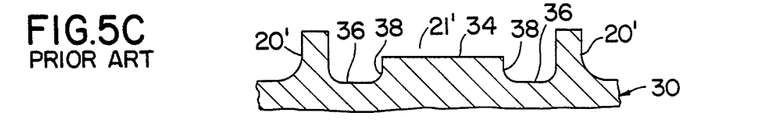
Figure 5D:
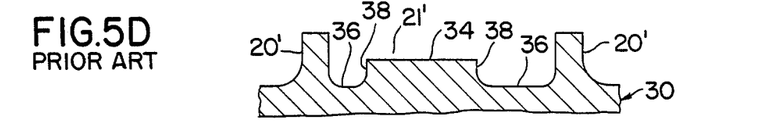
Figure 5E:
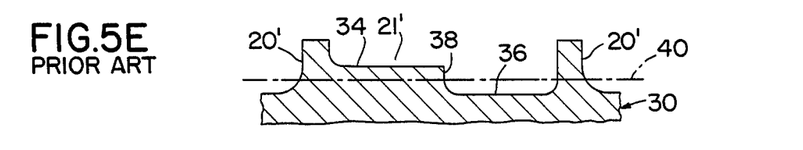

The metering section 20 provides the conventional function of pumping the molten resin from the screw to the valve or die region as is well known to those of skill in the art. However, in a further preferred aspect of this invention, the metering section has the "Pulsar TM" design which is that thoroughly described in U.S. Pat. No. 4,752,136. See, e.g., its FIGS. 1-3 and FIGS. 4 and 5 herein. FIG. 4 presents a blown-up view of metering section 30. FIG. 4 indicates five cross-sections 3A—3A, 3B—3B, 3C—3C, 3D—3D and 3E—3E, taken along the direction of resin flow. The views represented by these cross-sections are presented in FIG. 5.

The five cross-sectional views shown in FIG. 5 illustrate the changing configuration of the bottom surface of valley 21' experienced by molten resin as it flows through metering section 30. In section 3A—3A the entire right hand root level of valley 21' comprises shallow level 34 and the entire left hand root level of valley 21' comprises deep level or channel 36. The breadth of levels 34 and 36 are about equal. Line 40, which is about midway along the depth of shoulder 38, which connects the two levels, represents the normal or average metering depth of valley 21'.

Section 3B—3B shows that as the molten resin advances along valley 21' it experiences a changed root configuration. Shallow level 34 has migrated leftward and a portion of channel 36 on its left disappears but reappears on its right. This progression continues in section 3C—3C to the extent that about one-half of channel 36 to the left of shallow level 34 has disappeared but has reappeared to the right of shallow level 34. In section 3D—3D most of channel 36 has disappeared on the left of shallow level 34 and has reappeared to the right of shallow level 34. Finally, in section 3E—3E, channel 36 has disappeared entirely on the left of shallow level 34 and has reappeared in its entirety on the right of shallow level 34. Line 40 indicates no change in the normal metering depth during this progression. It is noted that the volume available for resin in each of the cross-sections 3A—3A through 3E—3E is essentially uniform. Additional sections along the flow path, not shown, would show the continuation of the progression indicated in FIG. 5.

The foregoing description has been given predominantly with respect to injection molding systems. For extrusion systems, successful operation is achieved analogously but, of course, design parameters will be different and can be routinely determined by those of skill in the art. This is especially true since extrusion screws are longer and do not involve the added complication of reciprocation. Typically, extrusion screw lengths will be larger by 20–80%, length to diameter ratios will be in the range of 24:1–36:1, pump ratios will be in the range of 1.5–2.0, higher and lower values being applicable in all cases.

This invention is applicable to injection molding and extrusion of all ionomers, e.g., copolymers of a carboxylic acid-type monomer and an alphaolefin monomer, said copolymer containing ionized carboxylic acid groups, Surlyn®, for all uses and shapes thereof, including golf ball covers, shoe soles, films such as barrier wraps, shrink wraps, etc., and many others. Typical, exemplary ionomers are disclosed in "Ionomers, Chemistry and New Developments," R.H. Kinsey, Applied Polymer Symposia, No. 11, 77–94 (1969). Formulations of ionomers with other components can also be processed in accordance with this invention.

Importantly, in view of this invention, it is no longer necessary that ionomers be provided and shipped in air-tight containers. They can now be successfully injection molded and extruded even in wet form. For example, Surlyn® exposed to ambient conditions can contain about 3,000–10,000 ppm of water, lower and higher amounts also being possible. Using this invention, these values will easily be reduced, e.g., to a content lower than the maximum content permissible at the point of extrusion in the die or injection into the mold. The precise amount of water tolerable at the die or mold entry point will vary with the particular application and processing parameters involved. In many cases, a 1000 ppm water content at mold entry is acceptable for injection molding and 500 ppm for die entry in extrusion. These and even lower values are readily achievable. Thus, the hygroscopicity of these ionomers no longer represents a major difficulty for injection molding and extrusion processors and they can be processed after substantial equilibration with ambient conditions.

Without further elaboration, it is believed that one skilled in the art can, using the preceding description; utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Fahrenheit and unless otherwise indicated, all parts and percentages are by weight.

The entire text of all applications, patents and publications cited above and below are hereby incorporated by reference.

EXAMPLES

Example 1

Experiments were run on a model 200RS Van Dorn 14 oz. machine. The injection molding screw had the configuration shown in FIGS. 2 and 3 (L/D=18:1). Conventional operating conditions were employed, including an overall cycle time of 30 sec., a medium injection speed, an injection pressure of 600 psi, a melt temperature of 380° F., a mold temperature of 80° F., and an injection time of 12 sec. A faster than normal screw rpm was employed as shown in Table 1 below. Material feed rates less than the capacity of the screw were also employed using a Spirex Starve Feeder system. These are also shown in the table below, along with moisture reduction results. In all cases, molded products met commercial specifications.

TABLE 1

| Resin | rpm | Feed Rate (% Screw Capacity Achieved) | Initial H$_2$O (wt. %) | H$_2$O Content After Molding (wt. %) | |
|---|---|---|---|---|---|
| | | | | Vacuum Vent | Atmosphere Vent |
| Surlyn 8940 | 140 | 40–55 | 0.76 | 0.05 | 0.07 |
| Surlyn 8920 | 140 | 40–55 | 0.97 | 0.055 | 0.089 |
| Surlyn 9970 | 140 | 40–55 | 0.14 | 0.078 | 0.083 |

Example 2

Example 1 was repeated using the same conditions except a 1 ⅜φ-75 ton Newbury 6 oz. machine (L/D=20:1) was employed. Again, the molded products met commercial specifications.

Example 3

Example 1 was repeated using the same conditions except a 40 mm φ-200 ton Van Dorn 8 oz. machine (L/D=18:1) was employed. Again, the molded products met commercial specifications.

Moisture levels before and after molding are shown below:

TABLE 2

| Resin | Initial H$_2$O (wt. %) | H$_2$O Content After Molding (wt. %) | |
|---|---|---|---|
| | | Vacuum Vent | Atmosphere Vent |
| Surlyn 8940 | 0.5641 | 0.0178 (10" Hg) | 0.0193 |
| Surlyn 9910 | 0.0637 | 0.0206 (11" Hg) | 0.0263 |
| Surlyn AD8118-2 | 0.0512 | 0.0089 (11" Hg) | 0.0127 |

Example 4

Example 1 is repeated except using a conventional extrusion apparatus. The same screw design is employed, except with an increased length (e.g., 20–30% larger) and L/D values of 24–36:1. In addition, the decompression zone is shorter by 30–50%. Similar reductions in moisture levels are achieved while producing commercially acceptable extruded products.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A method of injection molding a wet hygroscopic ionomer, comprising directly injection molding said wet ionomer using a reciprocating two-stage vented barrier screw having a feed side and an output side and having a barrier flight and a subsequent venting zone, wherein the barrier flight has a melt channel and a solids channel, the melt channel being only partially filled with melted ionomer and having a melt vapor phase adjacent thereto, whereby the vapor phase adjacent to melted ionomer in the barrier flight has access to said venting zone and vents therethrough, and whereby during said injection molding, said ionomer is dried to a degree sufficient that said injection molding is substantially free from problems which would otherwise occur were said wet ionomer to be injection molded without at least said degree of drying.

2. A method of claim 1, wherein the solids channel of the barrier flight is closed-ended at its output side.

3. A method of claim 2, wherein said melt channel increases in width and depth from its feed side to its output side.

4. A method of claim 2, wherein said screw rotates at an rpm rate which is higher than the rpm rate at which a single-stage reciprocating screw operably rotates when used to injection mold the hygroscopic ionomer in dry form.

5. A method of claim 2, wherein the wet ionomer contains an amount of water equal to that achieved after substantial equilibration with ambient conditions.

6. A method of claim 2, wherein the ionomer is fed into the barrier screw under control of a starve feeder.

7. A method of claim 2, wherein the ionomer is fed into the barrier screw at a rate less than the feed capacity of the screw.

8. A method of claim 4, wherein the ionomer is fed into the barrier screw at a rate less than the feed capacity of the screw.

9. A method of claim 2, wherein said ionomer is a copolymer of a carboxylic acid-type monomer and an alpha-olefin monomer and contains ionized carboxylic acid groups.

10. A method of claim 8, wherein said ionomer is a copolymer of a carboxylic acid-type monomer and an alpha-olefin monomer and contains ionized carboxylic acid groups.

11. A method of claim 2, wherein said screw has a second stage metering section substantially of the configuration shown in FIGS. 4 and 5.

12. A method of claim 8, wherein the barrier flight has the design substantially as shown in FIG. 3.

13. A method of extruding a wet hygroscopic ionomer comprising directly extruding said wet ionomer using a two-stage vented barrier screw having a feed side and an output side and having a barrier flight and a subsequent venting zone, wherein the barrier flight has a melt channel and a solids channel, the melt channel being only partially filled with melted ionomer and having a melt vapor phase adjacent thereto, whereby the vapor phase adjacent to melted ionomer in the barrier flight has access to said venting zone and vents therethrough, and whereby during said extruding, said ionomer is dried to a degree sufficient that said extruding is substantially free from problems which would otherwise occur were said wet ionomer to be extruded without at least said degree of drying.

14. A method of claim 13, wherein the solids channel of the barrier flight is closed-ended at its output side.

15. A method of claim 14, wherein said melt channel increases in width and depth from its feed side to its output side.

16. A method of claim 14, wherein the wet ionomer contains an amount of water equal to that achieved after substantial equilibration with ambient conditions.

17. A method of claim 14, wherein the ionomer is fed into the barrier screw under control of a starve feeder.

18. A method of claim 14, wherein the ionomer is fed into the barrier screw at a rate less than the feed capacity of the screw.

19. A method of claim 14, wherein said ionomer is a copolymer of a carboxylic acid-type monomer and an alpha-olefin monomer and contains ionized carboxylic acid groups.

20. A method of claim 14, wherein said screw has a second stage metering section substantially of the configuration shown in FIGS. 4 and 5.

* * * * *